United States Patent [19]
Wang

[11] Patent Number: 5,469,426
[45] Date of Patent: Nov. 21, 1995

[54] HIGH WRITE SPEED ERASABLE OPTICAL RECORDING DISK USING ACTIVE SEMICONDUCTOR DEVICES AT EACH PIXEL

[76] Inventor: Yu Wang, Department of Physics, University of Toledo, Toledo, Ohio 43606

[21] Appl. No.: 77,664

[22] Filed: Jun. 18, 1993

[51] Int. Cl.$^6$ ............................................. G11B 7/24
[52] U.S. Cl. ................... 369/275.2; 369/120; 369/126; 369/288; 369/292
[58] Field of Search ............................. 369/100, 120, 369/126, 275.2, 276, 284, 288, 292

[56] References Cited

U.S. PATENT DOCUMENTS 4,933,926  6/1990  Tabei et al. ........................ 369/100

FOREIGN PATENT DOCUMENTS 0139643  10/1980  Japan .................................. 369/126
0139644  10/1980  Japan .................................. 369/126

OTHER PUBLICATIONS

IEEE Trans. on Electron Devices, vol. ED–28 No. 7, Jul. 1981, Iwamura et al. "Rotating MNOS Disk Memory Device" pp. 854–860.

IBM Technical Disclosure Bulletin vol. 21, No. 6, Nov. 1978, Gunn et al. "Electrostatic Dish File" pp. 2558–2559.

Primary Examiner—Paul M. Dzierzynski
Assistant Examiner—David Vernon Bruce

[57] ABSTRACT

An optical recording disk system, which has a light-activated silicon controlled rectifier (LASCR), a resistor, and a recording film in each pixel, is used to record the optical information form the write beam. The write beam triggers the LASCR, which behaves as an optical switch, and lets an electric current pass the LASCR to generate either a thermal effect or an electro-optical effect on the recording film.

14 Claims, 3 Drawing Sheets

HIGH WRITE SPEED ERASABLE OPTICAL RECORDING DISK USING ACTIVE SEMICONDUCTOR DEVICES AT EACH PIXEL

BACKGROUND OF THE INVENTION

1. Field of the Invention

The Present Invention relates to optical recording and optical storage devices. More specifically, the present invention relates to erasable optical recording devices.

2. Prior Art

The current erasable optical recording disks on the market are magneto-optical (MO) disks, which have low write speed and their write speed is limited to 10 kHz or less; in addition, a high power laser is needed for the writing, which increases the cost. A fast write speed optical recording disk is highly desirable, especially if it only needs a low power laser for writing.

SUMMARY OF THE INVENTION

This invention is a high write speed optical recording disk. It can use slow response materials to reach the high write speed. Its write speed should be able to reach 100 MHz or even higher. In additional, only a low power laser is needed for writing.

In this invention, the write light is only used to trigger an optical switch to the ON position, then an electric current passes through this optical switch to generate either a thermal effect or an electro-optical effect on the recording film. Because the write light does not have to wait for the recording film to response, the write speed only depends on the time needed to trigger the optical switch, which could be nanoseconds or less.

The light-activated silicon controlled rectifier (LASCR) or opto-SCR is used in this invention as the optical switch. A silicon controlled rectifier (SCR) is a device that is normally nonconducting but goes into saturation when the gate-cathode junction is forward-biased. Once turned on, it will not turn off again until the anode current is removed externally. And for LASCR, the light is used to generate the gate bias current.

This invention is a many pixel device. FIG. 1-a shows the equivalent circuits of a single pixel of this device. The four semiconductor PNPN layer forms a light activated silicon controlled rectifier (LASCR). This LASCR is equivalent to a PNP transistor, a NPN transistor and a photodiode connected as FIG. 1-b. The blocking junction (depletion region) in the LASCR is the collector-base junction of the equivalent transistors. When light is absorbed by the LASCR, the photon-generated current flows through the emitter-base junction of each of the transistors in the equivalent circuit. The base of the NPN transistor is the gate of the LASCR. Hence, current through the base-emitter junction of the NPN transistor appears as the gate current of LASCR. Therefore, without light, there is no gate current and the device is essentially nonconducting. When no current passes through the resistor R and the recording film, nothing is written, and the bit is a digital 0. When the write beam shines on this pixel, a gate current is generated, and the device is switched to the ON or conducting state. This current can generate either thermal effects or electro-optical effects on the recording film, and a digital 1 is written. If the recording film is a thermal responsive conducting material (such as MO materials or phase change materials, or dye polymers), the current generates the joule heat through resistor R and heats the recording film to beyond its switching temperature, and the optical property of the film is changed and recorded. If the recording film is made of electro-optical material (such as ferroelectric materials or bistable liquid crystals) with higher resistance than the resistor R, when this device is switched to the ON state, most of the voltage is put across the recording film, and the optical properties of the film will be changed and recorded.

Because the write beam is only used to trigger the LASCR to the ON state, which takes nanoseconds or less, and does not have to wait for the response of the recording film, which is normally in milliseconds, this invention is a very high write speed device. To trigger the LASCR, only a low power laser is need for the write beam.

BRIEF DESCRIPTION OF THE DRAWING

FIG. 1-b Shows the equivalent circuit of the LASCR.

DETAILED DESCRIPTION

This invention is a multiple layer many pixel device. Each pixel includes: four semiconductor PNPN layers, which functions as a LASCR; a resistor layer; a conducting recording layer (which can be magneto-optical (MO) layer; or dye layer; or ferroelectric material layer; or bistable liquid crystal layer with ion implant). Then those layers are sandwiched by two ITO glass plates. The two ITO glasses are connected to the DC power supply through an external switch K.

Figure 1A:
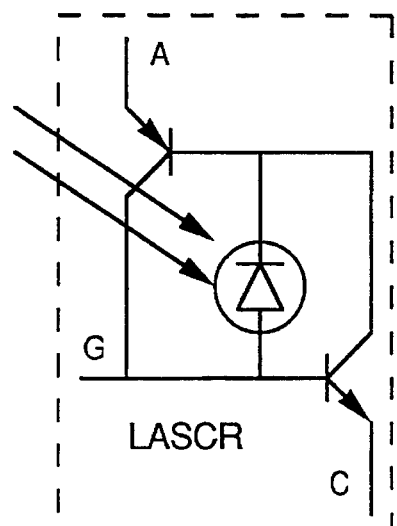
FIG. 1-a Shows the equivalent circuit of a single pixel of this invention.
Figure 1B:
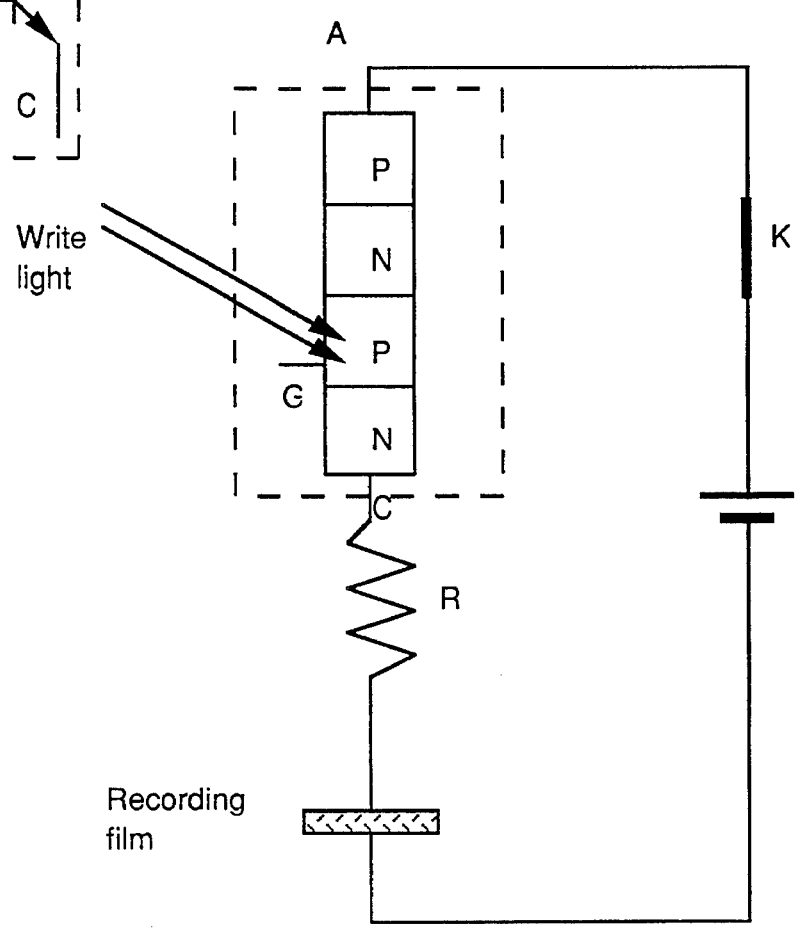
Figure 2:
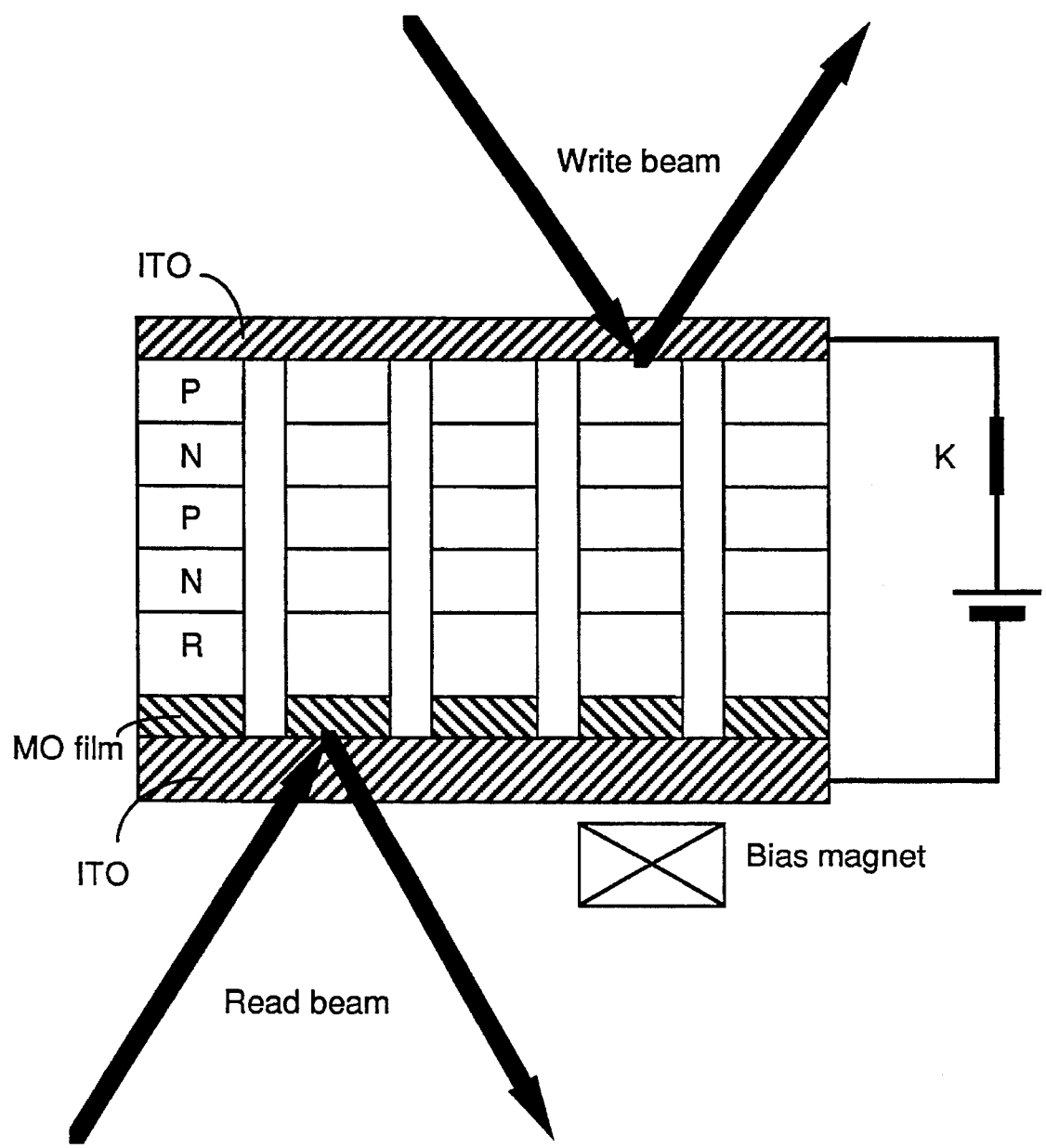
FIG. 2 shows the cross section of the structure of this invention with MO material as recording film.

FIG. 2 shows the structure of this invention with MO film. An ITO glass is used as the substrate. A four layer semiconductor PNPN film is deposited on the ITO glass, a resistor layer is made next to the four layer semiconductor film, and a conducting MO layer is made upon the resistor layer. The whole system is then etched into many independent pixels. Finally, another ITO glass is put on the MO layer as another electrode. The substrate ITO is connected to the positive terminal of the DC power supply through an external switch K, while the other ITO is connected to the negative terminal. A bias magnet is used. To write data on this disk, the external switch K is on. In each pixel, the four PNPN semiconductor layer forms a LASCR which functions as an optical switch. Without the write beam, this optical switch is off, and no current passes through this pixel. When the write beam shines on the top of this pixel, this optical switch is turned on by the write beam, then the write beam shifts to the next pixel. After the write beam has left this pixel, the LASCR is still on, and a current passes through resistor R and the recording MO film. The resistor R is generating joule heat to heat up the MO film. When the temperature of the MO film raises beyond a critical temperature, the magnetization of the MO film is changed by the bias magnetic field. This magnetic domain is "frozen" when the temperature drops, and thus a bit of data is written. Since the polarization of the reflected read beam changes when the magnetization of the MO film changes, the information of the write beam is stored as the change of the magnetization of the MO layer. After the writing process is completed, we need to wait an additional short time, usually in milliseconds, for the MO film of the last pixel to reach its critical temperature before the external switch K is turned off. Finally, the data can be read out by shining the read beam on the other side of the disk, also shown in FIG. 2, and the data is read from the bottom of the disk.

Figure 3:
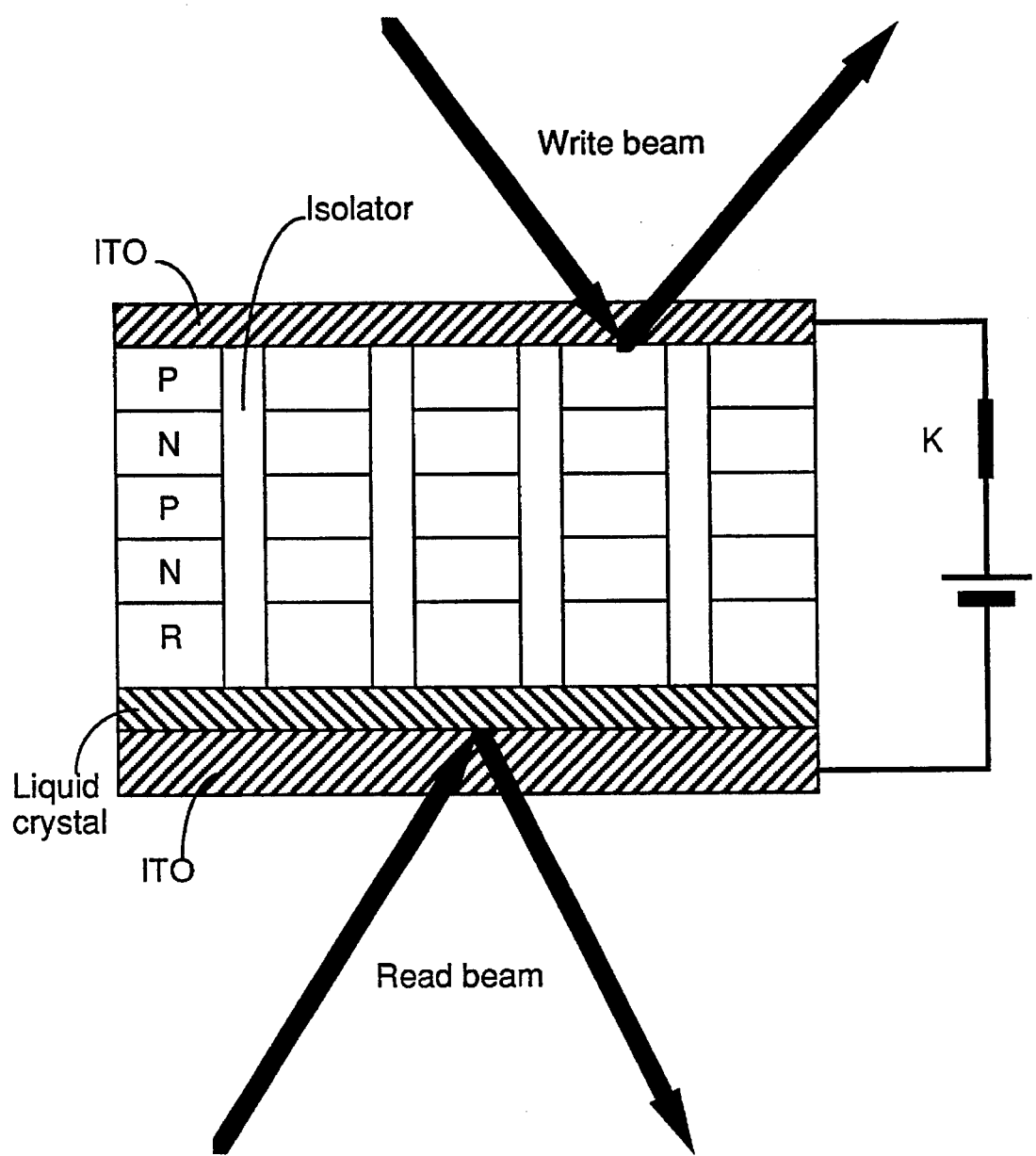
FIG. 3 shows the cross section of the structure of this invention with bistable liquid crystal as recording film.

FIG. 3 shows the structure of this invention with bistable liquid crystal film. An ITO glass is used as the substrate. A four layer semiconductor PNPN film is deposited on the ITO glass, a resistor layer is made upon the four layer semiconductor film. The whole layer system is then etched into many independent pixels. An isolator material is used to fill the spaces between the pixels. Then a thin bistable liquid crystal layer is put on this system and then sandwiched by this system and another ITO glass. The substrate ITO is connected to the positive terminal of the DC power supply through an external switch K, while the other ITO is connected to the negative terminal. The bistable liquid crystal has two stable states: clear and opaque. With ion implantation, the liquid crystal becomes a poor conductor with high resistance. Before recording, the whole liquid crystal layer is set up to one stable state, say clear, which is the digital 0. To write data on this disk, the external switch K is on. In each pixel, the four PNPN semiconductor layer forms a LASCR which functions as an optical switch. Without the write beam, this optical switch is off, and there is no electric voltage across the liquid crystal, thus the liquid crystal stays clear. When the write beam shines on the top of this pixel, this optical switch is turned on by the write beam, then the write beam shifts to the next pixel. After the write beam has left this pixel, the LASCR is still on, a voltage is generated across the liquid crystal layer, and the liquid crystal layer is turned to another stable state—opaque, and thus a bit of data 1 is written. Through the liquid crystals are slow response materials, by using this design, a high write speed can also be achieved. Similar to the MO film disk, an additional short time is need to wait for the liquid crystal in the last pixel to respond, then the data is read from the other side of the disk.

If the time required to turn on each LASCR is $T_{on}$, the number of bits to be recorded is n, and the response time required for each pixel is $T_{res}$, then the total time required for this whole recording process $T_{total}$ will be $$T_{total}=T_{on}*n+T_{res}.$$

Since $T_{on}$ is in the order of nanoseconds and $T_{res}$ is in the order of milliseconds, for data of 1 MB capacity, $T_{total}$ is still in the order of milliseconds.

There are two easy methods to erase the data stored on this invention, (a) shine light over all of the top surface of the disk, or (b) raise the voltage of the battery beyond the breakdown voltage of the LASCR. In either case, the data will be easily erased.

What I claim is:

1. An erasable high write speed electro-optical recording disk comprising:

two layers of transparent electrically conductive ITO glass for connecting to DC electric power through an external switch with an optical medium sandwiched between the layers, said optical medium comprising:
   a plurality of independent pixels, each pixel including a four layer semiconductor film, a resistor layer, and a recording layer.

2. The recording disk of claim 1 wherein the semiconductor film functions as a LASCR optical switch.

3. The recording disk of claim 1 wherein the recording layer is a thermal response material.

4. The recording disk of claim 1 wherein light is used to trigger the LASCR, which passes the DC power to the resistive layer to generate joule heat on the recording layer.

5. The recording disk of claim 1 wherein said disk has a very high write speed of 100 MHz or higher.

6. The recording disk of claim 1 wherein only a low power laser is used as a write beam.

7. The recording disk of claim 1 wherein data is written by applying a write beam to one side of the disk and read by applying a read beam to the other side of the disk.

8. The recording disk of claim 4 wherein the recording layer is a magneto-optical material.

9. The recording disk of claim 4 wherein the recording layer is a phase change material.

10. The recording disk of claim 4 wherein the recording layer is a dye polymer.

11. The recording disk of claim 1 wherein light is used to trigger the LASCR, which passes the DC power to the resistive layer to generate an electric field on the recording layer.

12. The recording disk of claim 11 wherein the recording layer is an electrical response material.

13. The recording disk of claim 12 wherein the electrical response material is a bistable liquid crystal.

14. The recording disk of claim 12 wherein the electrical response material is a ferroelectric material.

* * * * *